3,268,628
2-S-(O,O-DIALKYLPHOSPHORODITHIOYL)-METHYLMERCAPTOETHYL CHLOROFORMATES
Arnold D. Gutman, Oakland, Donald G. Stoffey, El Cerrito, and James T. Hallett, Saratoga, Calif., assignors to Stauffer Chemical Company, New York, N.Y., a corporation of Delaware
No Drawing. Filed Jan. 16, 1963, Ser. No. 251,725
3 Claims. (Cl. 260—948)

This invention relates to the use of certain novel compositions of matter as insecticides and miticides.

More particularly, the present invention relates to novel phosphate compounds having the following structural formulae:

In the above formulae, $R_1$ and $R_2$ represent lower alkyl radicals. By lower alkyl radicals is meant alkyl radicals having from one to five carbon atoms.

In general, the process for producing the novel compounds involves reacting the appropriate O,O-dialkyl S-(2-hydroxymethyl) - mercaptomethyl phosphorodithioate with or without a solvent and an excess of phosgene, the phosgene being bubbled through the phosphate-containing solvent. After the reaction is completed, excess phosgene is removed by evaporation and the desired product collected.

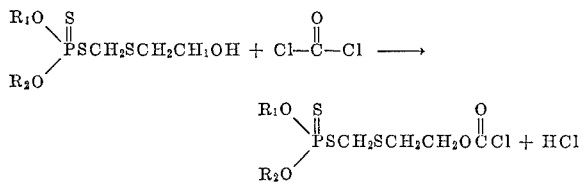

The following non-limiting examples illustrate the method of making the compounds of the present invention.

Example 1.—Compound 1-2-S-(O,O-diethylphosphorodithioyl)-methylmercaptoethyl chloroformate Into a solution of 13.8 grams (0.05 mole) of O,O-diethyl-S-(2-hydroxyethyl) - mercaptomethyl phosphorodithioate in 50 ml. of ethyl ether was bubbled 10 grams (0.1 mole) of phosgene. After three hours the solvent and excess phosgene were removed on a rotary evaporator, first at 20 mm. and then at 0.3 mm., to give 19.5 grams of a water-white product, $n_D^{30}$ 1.5342. The yield was 100%.

Example 2.—Compound 2-2-S-(O,O-dimethylphosphorodithioyl)- methylmercaptoethyl chloroformate In a manner similar to that given in Example 1 supra, 100 grams (0.403 mole) of O,O-dimethyl-s-(2-hydroxyethyl)-mercaptomethyl phosphorodithioate and 100 grams (1.0 mole) of phosgene with no solvent were allowed to react together overnight. The excess phosgene was removed as before to give 120 grams of the water-white product, $n_D^{30}$ 1.5500. The yield was 96%.

Compounds prepared as above were tested and found to be excellent insecticides and acaricides. The biological effectiveness of the compounds was determined by testing them as follows:

Insecticidal evaluation tests.—Three insect species were subjected to evaluation tests for insecticides:

(1) Housefly (HF) Musca domestica (Linn.)
(2) American cockroach (roach) periplaneta americana (Linn.)
(3) Large milkweed bug (MWB) Oncopeltus fasciatus (Dallas).

Test insects were caged in cardboard mailing tubes 3⅛ inches in diameter and 2⅝ inches tall. The mailing tubes were supplied with cellophane bottoms and screened tops. Ten to twenty-five insects were used per cage. Food and water were supplied to each cage. The caged insects were sprayed with the active compound at various concentrations under controlled conditions so the results or activity of each compound could be correlated. The results are reported in percent concentration for the lowest concentration to effect a 100% kill.

Housefly evaluation tests differed in this respect: The toxicant was dissolved in a volatile solvent, preferably acetone; varying amounts of the dissolved active compound is pipetted into a petri dish bottom, allowed to dry and is placed in a cardboard mailing tube. Twenty-five female flies are caged in the tube. The flies are continuously exposed to the known residue of the active compound in the cage. After twenty-four and forty-eight hours, counts are made to determine living and dead insects. The LD–50 values are then calculated using well known procedures and the LD–50 values are reported in the activity table which follows later in the specification.

Acariciadal evaluation test.—The two-spotted mite, Tetranychus telarius (Linn.), is employed in the testing of acaricides. Young pinto bean plants are infested with several hundred mites. Dispersions of test compounds are prepared by dissolving various amounts of toxic material in ten milliliters of acetone. This solution is then diluted with water containing 0.0175% v./v. of Tween R20, an emulsifier, the amount of water being sufficient to give the desired concentration of active ingredient. Equal volumes of test suspensions are then sprayed on the infested pinto bean plants. After seven and fourteen days, the plants are examined both for postembryonic forms of the mite as well as for eggs. The results are reported as percent concentration which gave 100% control.

Systemic activity of the compounds under test were demonstrated and are reported under the "2SM Systemic" column of the activity table. In this test, pinto bean plants in the primary leaf stage are placed in bottles containing 200 ml. of the test solution and held in place with cotton plugs. Only the roots are immersed. The test solutions are prepared by dissolving the compounds under test in a suitable solvent, usually acetone, and then diluting with distilled water. The final acetone concentration never exceeds 1%. The toxicants are then tested at varying concentrations. After the plants are placed in the test solutions, they are infested with mites. Mortalities of post-embryonic, nymphal and ovicidal forms are determined after seven days by comparison with control plants. The results are reported as concentrations which gave complete control. This test demonstrates the root absorption and upward translocation of the candidate synthetic compound.

The following results were obtained.

| Compound No. | HF, μg. | Roach, percent | MWB, percent |
|---|---|---|---|
| 1 | 30 | <0.1 | 0.08 |
| 2 | 30 | 0.03 | 0.08 |

| Compound No. | Adults, percent | 2 SM, Nymphs, percent | Eggs, percent | Systemic, p.p.m. |
|---|---|---|---|---|
| 1 | 0.001 | 0.03 | 0.1 | 8 |
| 2 | 0.003 | 0.03 | >0.1 | 1 |

We claim:
1. A compound of the formulae:

$$\begin{array}{c} R_1O \\ \phantom{R_1O}\diagdown \\ \phantom{R_1O}\phantom{\diagdown}P\text{SCH}_2\text{SCH}_2\text{CH}_2\text{OCCl} \\ \phantom{R_1O}\diagup \\ R_1O \end{array}$$

with S double-bonded to P and O double-bonded to C.

wherein $R_1$ and $R_2$ are lower alkyls.

2. A compound as stated in claim 1 wherein $R_1$ and $R_2$ are ethyl radicals.

3. A compound as stated in claim 1 wherein $R_1$ and $R_2$ are methyl radicals.

References Cited by the Examiner
UNITED STATES PATENTS

| 2,410,862 | 11/1946 | Bousquet et al. | 167—22 |
| 2,895,869 | 7/1959 | Bluestone | 167—22 |
| 3,020,304 | 2/1962 | Scherer et al. | 260—461 |
| 3,020,305 | 2/1962 | Chupp | 260—461 |

CHARLES B. PARKER, *Primary Examiner.*

GEORGE A. MENTIS, *Assistant Examiner.*